Nov. 20, 1956 J. J. ZIMMERMAN 2,771,050

AUTOMATIC SOLDERING MACHINE

Filed March 8, 1955 4 Sheets-Sheet 1

INVENTOR.

Jack J. Zimmerman

BY

Mueller & Aichele

Attys.

INVENTOR.
Jack J. Zimmerman
BY
Mueller & Aichele
Attys.

Nov. 20, 1956 J. J. ZIMMERMAN 2,771,050

AUTOMATIC SOLDERING MACHINE

Filed March 8, 1955 4 Sheets-Sheet 3

INVENTOR.
Jack J. Zimmerman
BY
Mueller & Aichele
Attys.

Nov. 20, 1956 J. J. ZIMMERMAN 2,771,050

AUTOMATIC SOLDERING MACHINE

Filed March 8, 1955 4 Sheets-Sheet 4

INVENTOR.
Jack J. Zimmerman
BY Mueller & Aichele
Att'ys.

United States Patent Office 2,771,050

Patented Nov. 20, 1956

2,771,050

AUTOMATIC SOLDERING MACHINE

Jack J. Zimmerman, Riverside, Ill., assignor to Motorola, Inc., Chicago, Ill., a corporation of Illinois Application March 8, 1955, Serial No. 492,949

9 Claims. (Cl. 113—59)

The present invention relates to an improved mechanism for automatically soldering the connecting junctions of electronic apparatus such as radio receivers, television receivers and the like; more particularly, the invention is concerned with such an improved mechanism for selectively soldering a plated or printed circuit panel assembly.

In recent years, plated or printed circuit techniques have been applied to the electronic art to improve and render more efficient the manufacturing process of radio and television equipment and the like. The plated circuit assembly includes an insulated panel provided with a conductive design plated or otherwise formed on one or both surfaces thereof. This conductive design is used to replace the wire leads previously used to make the required connections. This plated circuit construction eliminates the many operations previously required in cutting and forming wire leads.

Even with the plated circuit assemblies, however, the connections between various components and the circuit formed on the insulated panel are still soldered. In the past, this soldering was carried out manually which added unduly to the manufacturing cost of each unit. The plated circuit assembly does lend itself to dip soldering techniques, and such techniques have been used in some instances. However, even though dip soldering enables a multiplicity of connections to be soldered simultaneously for increased soldering speed and efficiency, the process has several limitations since it applies solder to unwanted portions of the assembly and often produces bridging and other undesired results.

In order to provide improved automatic soldering for plated and printed circuit assemblies, and to overcome the limitations of dip soldering methods, applicant devised the machine and method disclosed and claimed in copending application 292,424, filed June 9, 1952. In the machine of that application, a series of elongated individual solder carrying cups or members were mounted on an elevator in an upright position and immersed in molten solder. These members were each in the form of a rod with a shallow depression at its upper end. The panels to be soldered were successively positioned directly over the molten solder container, and the solder-carrying members were raised to an elevated position to carry individual solder globules to local areas of the panel that required soldering.

Copending application 449,119, filed August 11, 1954 also in the name of the present inventor, disclosed a different type of automatic soldering machine, but one which also used a series of upright elongated solder cups to provide soldering of localized points on plated circuit assemblies successively positioned over the soldering station.

Both the machines disclosed in the copending applications referred to above have operated satisfactorily. However, some difficulty has been encountered in maintaining the individual elongated solder carrying members of these machines free from oxides which have a tendency to form between such members on the outer surface thereof after the machines have been in use, and which in time tend to clog the machine.

It is an object of the present invention to provide an improved automatic soldering machine which provides selective and localized soldering to a printed or plated circuit assembly, and in which the disadvantages inherent in prior machines of this general type are eliminated.

Yet another object of the invention is to provide such a selective soldering machine, which is constructed so that the solder carrying members therein are not subject to deleterious effects from the formation of solder oxides thereon.

A feature of the invention is the provision in an automatic soldering machine of a soldering mechanism in which tubular members are used to replace the elongated solder cups of the prior machines discussed previously herein, with molten solder being forced up the tubes to form a meniscus at the top in localized soldering contact with the various contact points or areas on the underside of a plated circuit assembly positioned thereover.

Another feature of the invention is the provision of such an improved soldering mechanism, in which a reservoir for molten solder is moved between an upper and a lower position, with the arrangement being such that solder is forced up the tubes when the reservoir is in its upper position for convenient and rapid soldering of successive panels synchronized to be positioned over the solder station each time the reservoir is brought to its upper position.

Another feature of the invention is the provision in such an improved soldering mechanism of means for reeling replenishing solder into the reservoir when it is in its lower position, which reeling means is automatically controlled to terminate its operation when the molten solder in the reservoir reaches a selected level.

Yet another feature of the invention is the provision in such an improved soldering mechanism of a gravity operated solder displacing mechanism which is automatically cocked when the reservoir is brought to its upper position, and which includes a moving piston which slowly drops after the cocking of the mechanism to displace the molten solder in the reservoir and force it up through the tubes to form a soldering meniscus at the top of each such tube.

The above and other features of the invention which are believed to be new are set forth with particularity in the appended claims. The invention itself, however, together with further objects and advantages thereof may best be understood by reference to the accompanying drawings in which:

Fig. 1 is an elevational view partly in section of an automatic soldering machine incorporating the soldering mechanism of the invention;

Fig. 1*a* is a perspective view of certain components of the machine of Fig. 1;

Figure 2:
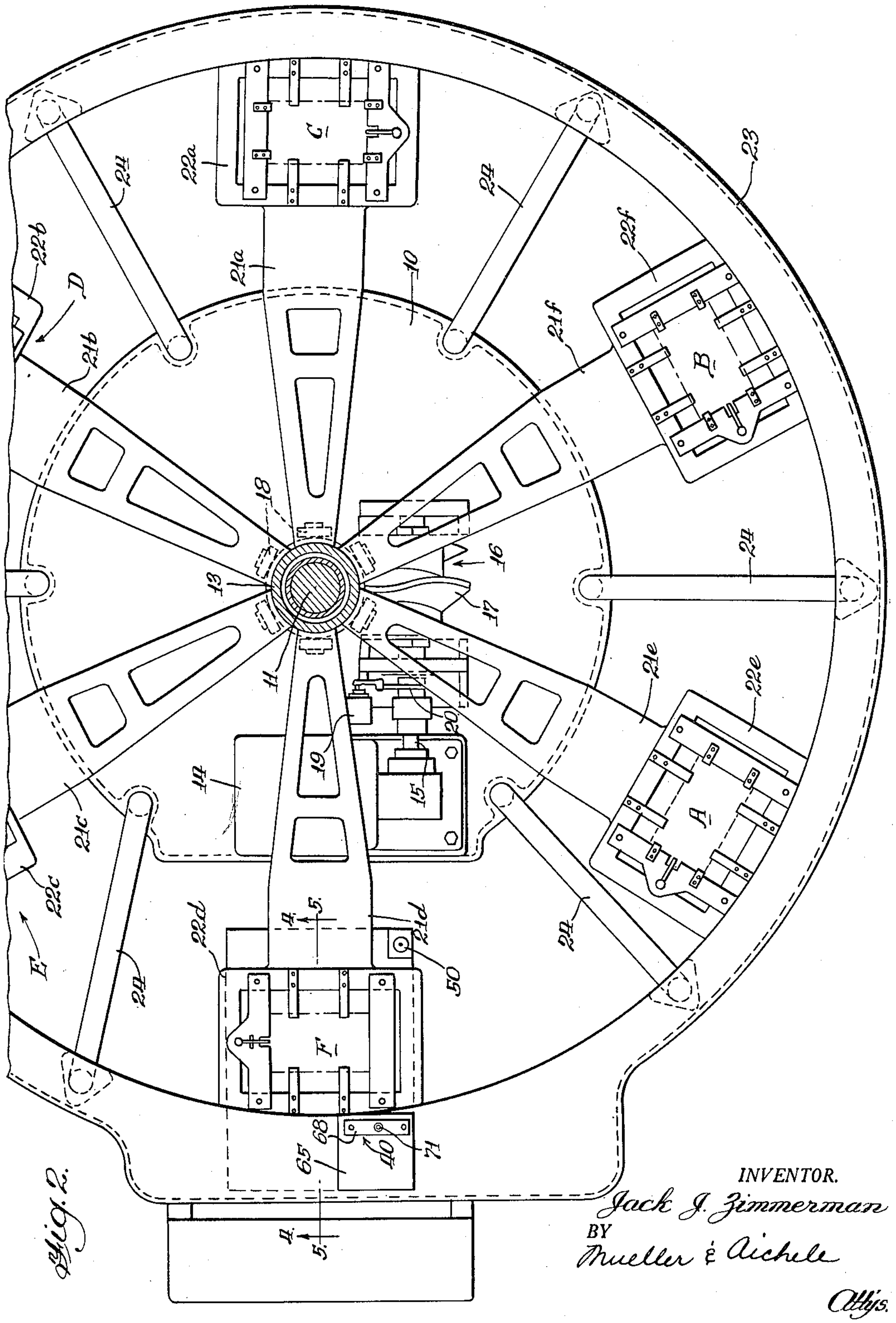
Fig. 2 is a top plan view of the machine.
Figure 3:
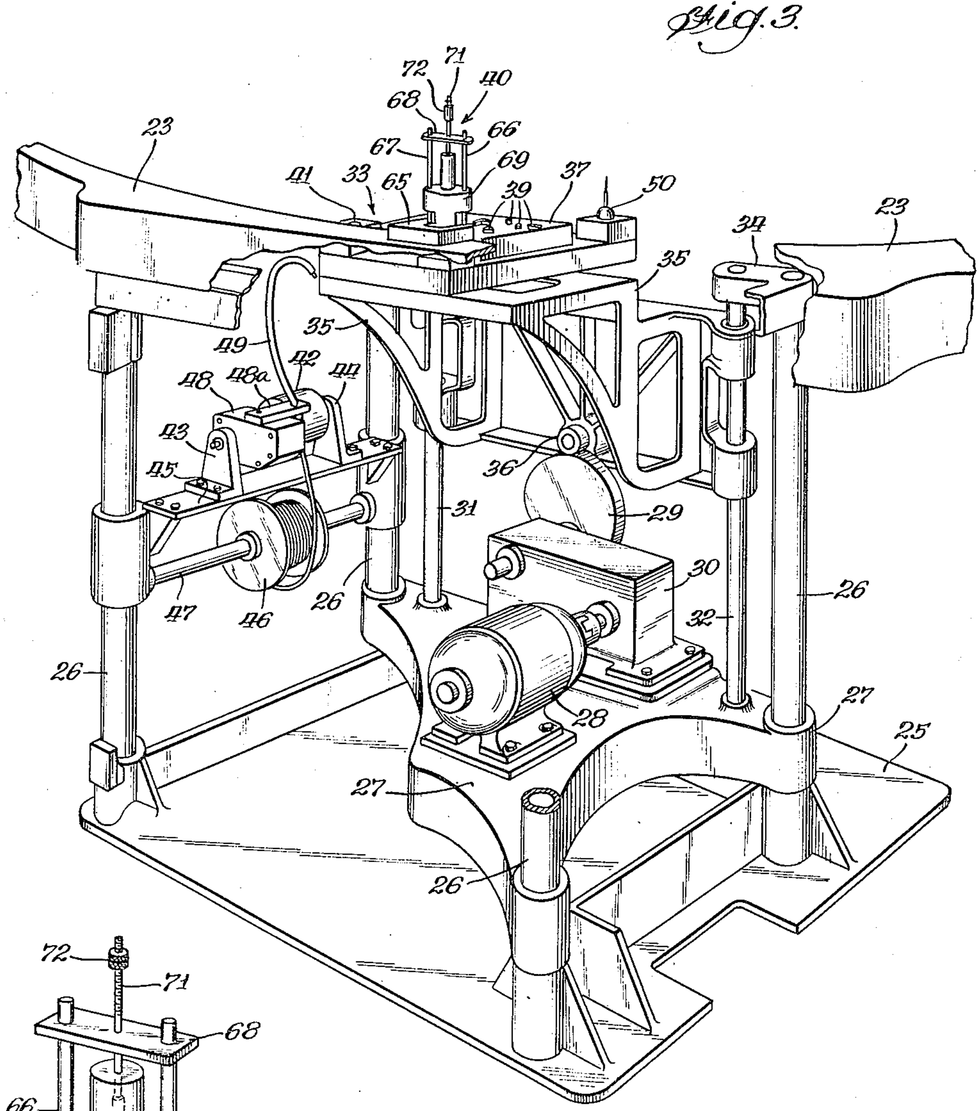
Fig. 3 is a perspective view of the improved soldering mechanism of the present invention.
Figure 3A:
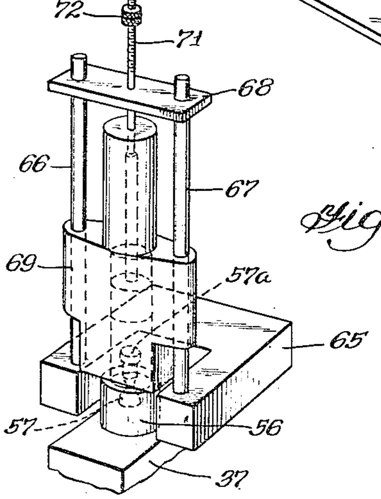
Figures 4, 5:
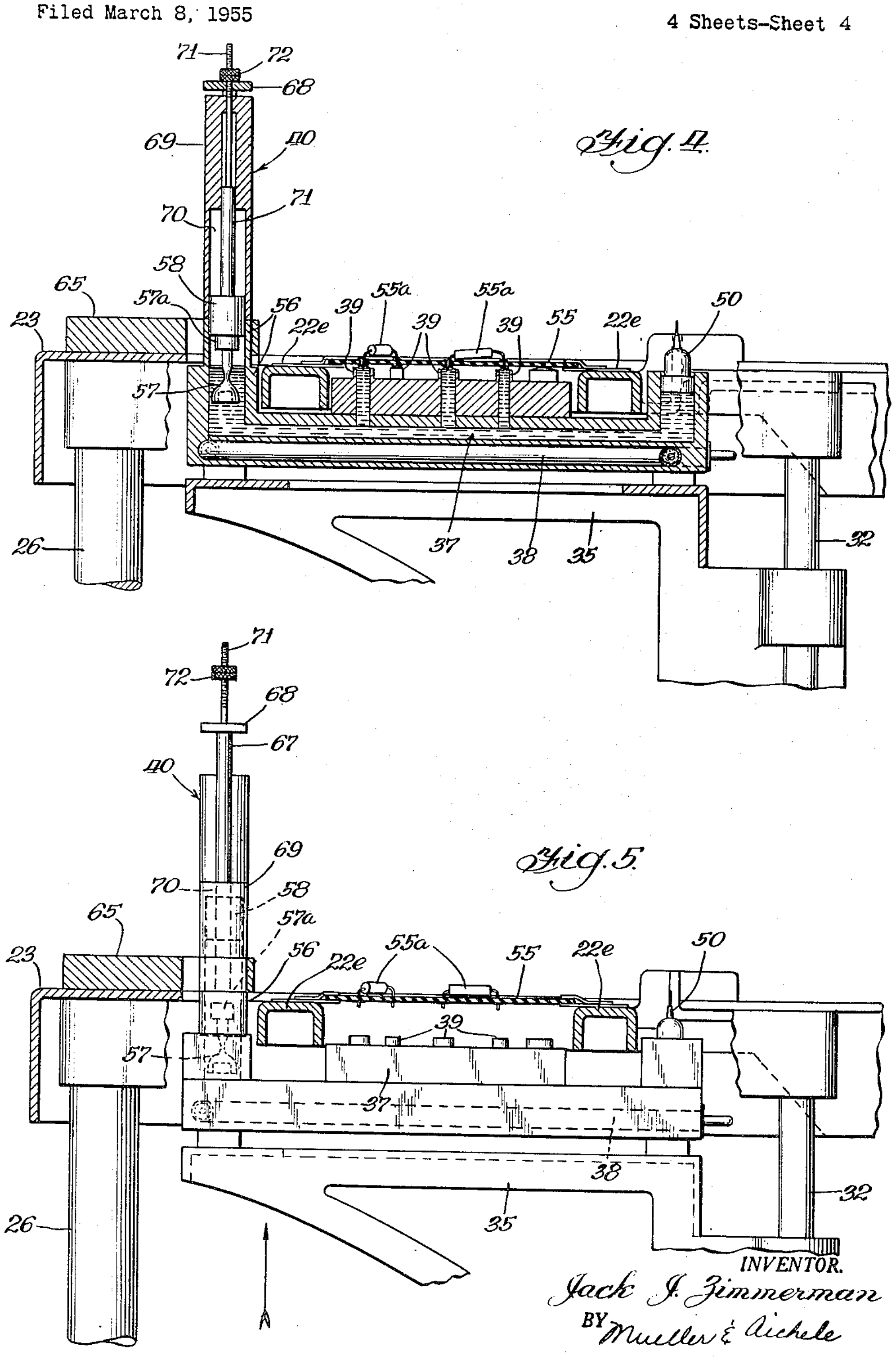

Fig. 3*a* is a fragmentary perspective view of a portion of the soldering mechanism of Fig. 3 to illustrate more fully a solder-displacing device utilized therein; and Figs. 4 and 5 are sectional views taken along the lines 4, 5—4, 5 of Fig. 2 and illustrating the action of the soldering mechanism.

The present invention provides a machine for selectively applying solder to metallic conductors supported on the underside of an insulated panel, and the machine includes a conveyor having a fixed support and a moving element carried by the support. At least one panel-supporting means is affixed to the moving element, and a soldering mechanism is provided over which the panel-supporting means is moved so as to position the insulating panel horizontally thereover. The soldering mechanism comprises a carriage supported for reciprocal vertical motion, and a driving means for moving the carriage between a lower and an upper position. An enclosed reservoir for molten solder is supported on the carriage, and this reservoir has a series of open-ended tubes extending upwardly therefrom. A solder-displacing device is supported adjacent the reservoir, and this device is adapted to operate when the carriage is in its upper position to displace molten solder in the reservoir and force it upwardly through the tubes to form a meniscus at the top of each such tube in localized soldering contact with a corresponding area on the plated circuit panel that is to be soldered.

Many of the details of the machine illustrated in the drawings are similar to those disclosed in the copending application 449,119; and the description herein of the entire machine will be limited to that necessary for a clear understanding of the operation of the soldering mechanism of the present invention.

Figures 1, 1A:
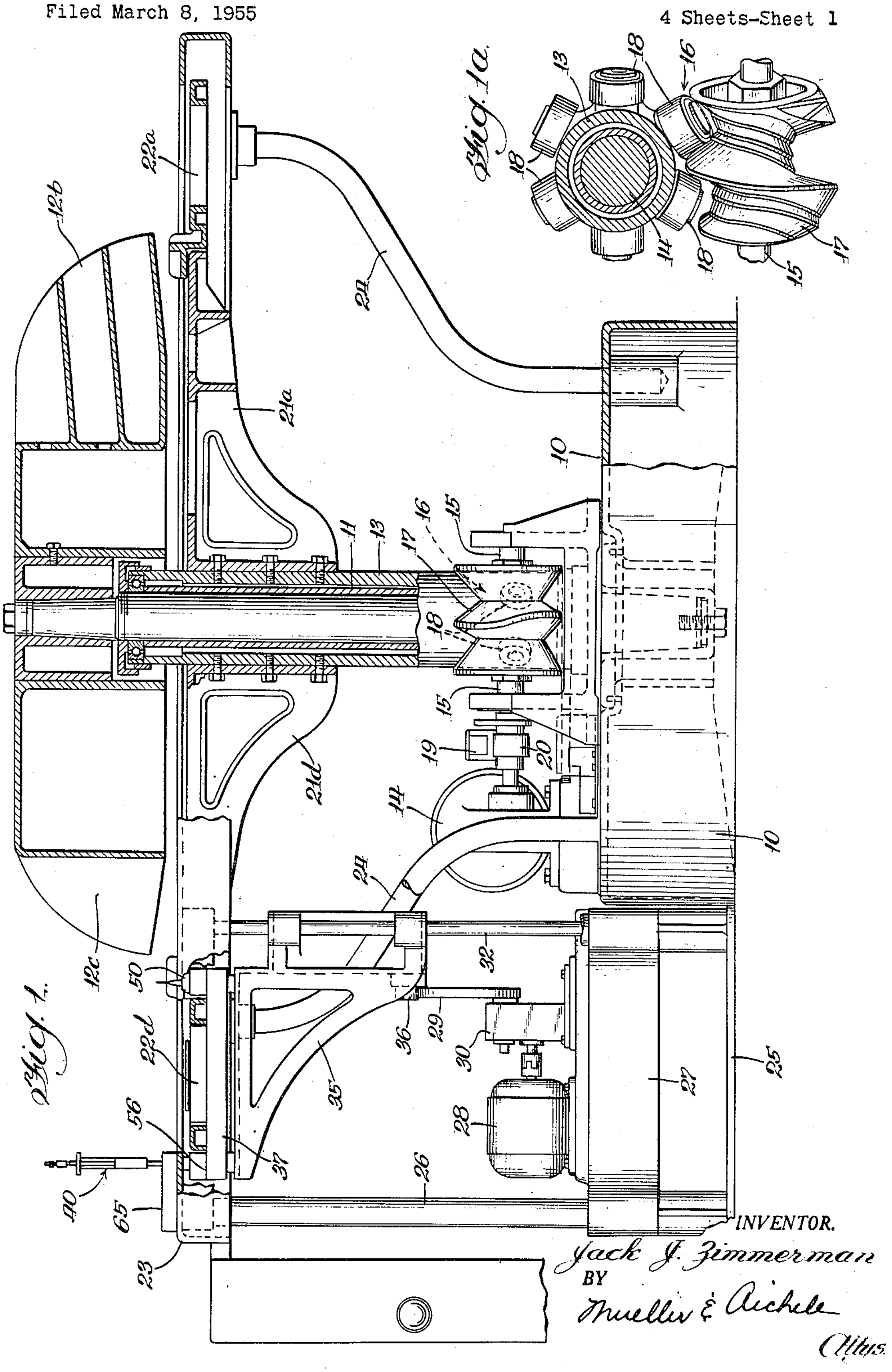

As shown particularly in Fig. 1, a stationary vertical spindle 11 is mounted on a base 10 and extends upwardly therefrom. A series of bins **12*b* are supported at the top of spindle 11 and extend radially outward therefrom to be positioned respectively at various stations that are to be described. A counterweight 12*c* for the bins is also supported by spindle 11 and is positioned over a soldering station at which the mechanism of the invention is positioned, which mechanism will be described in detail hereinafter. The purpose of the bins 12*b* is to hold the various components that are to be inserted in the plated circuit panel assemblies at the various stations. A rotatable tubular spindle 13 is also supported by base 10, and this spindle extends upwardly from the base in coaxial relation with the stationary spindle 11** and surrounds the stationary spindle.

A drive motor 14 is mounted on base 10, and the drive motor has a usual speed reducer and solenoid brake associated therewith. A horizontal drive shaft 15 extends from the speed reducer, and this shaft is coupled to the rotatable spindle 13 through a Ferguson three-dimensional cam drive assembly 16. The Ferguson drive assembly is shown in detail in Fig. 1*a*, and it comprises a cam 17 affixed to the drive shaft 15, and it also comprises a plurality of disc-like cam followers 18 rotatably mounted around the periphery of spindle 13 on respective uniplanar radial axes of that spindle and angularly spaced equidistantly around the periphery. The cam followers 18 are in the form of ball-bearing races secured to radially extending studs on the spindle.

As described in the aforementioned application Serial No. 449,119, this drive assembly is such that 270° rotation of drive shaft 15 produces a 60° rotation of spindle 13, and the remaining 90° rotation of the drive shaft is within the vertical dwell of cam 17 wherein spindle 13 remains at rest. Shaft 15 has a cam 20 mounted thereon, and this cam trips a limit switch 19 upon each revolution of the drive shaft and at the beginning of the dwell period mentioned above. Tripping of the limit switch de-energizes motor 14 and actuates the solenoid brake associated therewith to stop the motor. Since this action takes place during the dwell interval, the angular position of spindle 13 is determined by the Ferguson drive assembly and is not dependent on the precision of the motor tripping circuit. Therefore, spindle 13 is stopped at the end of each 60° angular movement thereon, and its angular position at each stop is precisely fixed by the drive assembly.

A series of pallet arms **21*a*–21*f* (see particularly Fig. 2) are affixed to the upper end of spindle 13, and these arms extend radially upward from the vertical spindle at equal angles with respect to one another. A corresponding series of panel-supporting members or pallets 22*a*–22*f* are bolted to the free ends of respective ones of the pallet arms. Each pallet may have a construction similar to that shown and described in copending application 449,119, and it includes essentially a frame on which the plated circuit panel is rigidly but removably supported over a central opening by appropriate resilient clamps. The pallets are surrounded by a guard rail 23 which is supported on base 10 by a series of legs 24**.

The soldering station is illustrated as being positioned under the pallet **22*e* for the illustrated position of the machine, and it is apparent that actuation of motor 14 causes the pallets successively to be brought over and arrested over the solder station as spindle 13** rotates. The action of the Ferguson drive is such that each pallet is precisely positioned over the solder station during the arrested position.

Assuming in Fig. 2 that the machine is rotating in a counterclockwise direction, and that there are six stations indicated A–F. At station A, a soldered, plated circuit panel from the solder station F is removed and a new panel is snapped in place on a pallet as each pallet is arrested at that station. At stations B—E, various components to be supported on the panels are removed from bins **12*b* and appropriately positioned on each panel usually with pigtail connections extending into metallized eyelets in the panel. At the solder station F, these connections of the components are soldered to the plated circuit on each panel. As previously noted, the motion of the pallets is intermittent, with energizing motor 14 being de-energized for each dwell interval of the cam assembly 16, so that the pallets are arrested for a definite time interval at each station. That is, each revolution of drive shaft 15 rotates spindle 13 through 60° so as to move the pallets from one station to the next. At each station the motor is stopped for a selected interval, and spindle 13** is precisely positioned by the Ferguson drive assembly at each station so that a pallet is accurately positioned over the solder station.

The mechanism at the solder station includes a base 25 having a series of upright posts 26 extending upwardly therefrom (Figs. 1 and 3). Posts 26 support a base 27 which, in turn, has a drive motor 28 mounted thereon, which motor drives a cam 29 through a usual reducing gear system 30. A pair of spaced parallel upright guide members 31, 32 are also mounted on base 27 and are supported in brackets 33, 34 secured to the upper end of corresponding posts 26. A carriage 35 is slidably supported by guide members 31, 32 for reciprocal motion between a lower position and an upper position. Carriage 35 has a cam follower 36 rotatably mounted thereon which engages cam 29, the cam being shaped so that rotation of motor 28 moves carriage 35 between its upper and lower positions. The cam is also shaped to produce a "dwell" for carriage 35 when the carriage reaches its upper position. This dwell enables the carriage to be arrested in its upper position so that the soldering operations can be made.

An enclosed solder reservoir 37 (composed, for example, of steel which may be chrome plated) is supported on carriage 35, and the reservoir has a series of heating elements 38 (Figs. 4, 5) to maintain the solder therein in a molten condition. Reservoir 37 has a series of open-ended tubes 39 (which, likewise, may be composed of chrome-plated steel) extending upwardly from the interior thereof along spaced parallel vertical axes. These tubes are positioned in a pattern corresponding to points or areas on the plated circuit panel to which the solder is to be applied, and they are of a selected length so that their upper extremities terminate in a common horizontal plane spaced a selected distance from the underside of the plated circuit panel when the carriage 35 is in its upper position.

A solder displacing device or mechanism 40 (which will be described in detail hereinafter) is mounted on guard rail 23 and has a piston portion 58 that cooperates with a hollow cylindrical-shaped member or well 56 in reservoir 37. The action of mechanism 40 is such that when the reservoir 37 is moved to its upper position, the piston engages a solder displacing plunger which slowly displaces molten solder in the reservoir so that the solder rises in tubes 39 to form a meniscus at the top of each such tube in local soldering contact with the plated circuit panel.

Reservoir 37 includes a well 41 for replenishing the molten solder within the reservoir. A motor 42 has a drive shaft extending between a pair of spaced brackets 43, 44 which, in turn, are mounted on a cross arm 45 extending between a pair of the posts 26. A reel 46, adapted to support a coil of wire solder, is rotatably supported by a bar 47 likewise mounted on the posts 26. A drive or feeding means 48 for the wire solder on reel 46 is mounted on the shaft motor 42 between brackets 43, 44. The feeding means includes a pair of knurled wheels supported by arm 48*a* and which are driven by the motor shaft through a series of reducing gears. The knurled wheels engage the wire solder to feed it into a tubular guide 49. The arrangement is such that when carriage 35 is in its lower position, motor 42 is energized and first causes feeding means 48 to tilt a limited distance around the motor shaft. This causes arm 48*a* to bring the remote end of tubular guide 49 into position over well 41 so that the wire solder from reel 46 may be fed into the well by feeding means 48. Subsequent rotation of motor 42 causes solder to be reeled through the guide by the feeding means and into the well. When the solder rises within reservoir 37 to a selected level, a float 50 rises and trips a limit switch. This de-energizes motor 42 and causes feeding means 48 to assume an upright position, so as to swing the remote end of guide 49 away from well 41 and out of the path of the reservoir. A suitable spring means may be provided to return unit 48 to its upright position when motor 42 is de-energized.

The action of solder-displacing mechanism 40 may best be understood by reference to Figs. 3*a*, 4 and 5. As shown, for example in Fig. 4, pallet 22*e* supports an insulated panel 55 directly over solder reservoir 37 in a horizontal position. The panel has certain components 55*a* supported thereon which have pigtail connections extending through metallized eyelets in the panel, and which pigtails are to be soldered to the eyelets so as to make electrical contact with the plated circuit formed on the panel. Fig. 4 shows carriage 35 in its upper position so that the tops of tubes 39 are spaced a selected distance from the underside of panel 55.

Reservoir 37 has a well 56, as previously noted, communicating with the interior thereof, and the well is positioned to be directly under the solder-displacing mechanism 40. The solder-displacing plunger member 57 is supported in well 56, and this plunger floats on the surface of the molten solder in the well. The plunger may be shaped to provide an air trap at its under surface, as shown, to aid buoyancy, and it has an upwardly extending portion 57*a* which is engaged by a piston 58 in the solder-displacing mechanism 40.

When the reservoir 37 is in its upper position, as shown in Fig. 4, piston 58 engages the portion 57*a* of plunger 57 in a manner to be described and, due to its superior weight, slowly forces plunger 57 downwardly into the reservoir 37 until the plunger is submerged in molten solder. This downward motion of plunger 57 displaces the molten solder within the reservoir and causes it to rise in the tubes 39. The extent of such downward motion is controlled so that a solder meniscus is formed at the top of each tube as the plunger is submerged in the molten solder. These meniscuses flow by heating and alloying action up the corresponding metal eyelets in panel 58 and to all exposed adjacent metal surfaces quickly and efficiently to perform a soldering function. The plunger 57 is shaped with a top portion of diminishing section so that its submersion into the molten solder first displaces solder relatively quickly up the tubes 39 to form the meniscuses, and then relatively slowly supplies more solder to the tops of the tubes to replenish the solder transferred to the panel by the soldering action.

The solder-displacing mechanism 40 (Figs. 3, 4*a*, 5) includes a base 65 which is mounted on guard rail 23. A pair of upright spaced parallel vertical guide members 66, 67 are mounted on base 65, and the upper end of these guide members are interconnected by a cross-bar 68. A hollow member 69 is slidably supported on the guide members 66, 67 for reciprocal vertical motion, and this hollow member has a vertical cylindrical shaped opening 70 extending upwardly from the bottom thereof. The piston 58 is supported within the opening 70 in close sliding fit for reciprocal motion along a vertical axis. A connecting rod 71 is affixed to the piston, and the rod extends vertically upward through the member 69 and through an aperture in cross-bar 68. The connecting rod 71 has an adjustable nut 72 secured to its upper end and which functions as a load for the piston, and it also functions to engage cross-bar 68 at the completion of the downward stroke of the piston to provide an adjustable limit for such downward stroke.

When the reservoir 37 is moved to its upper position, shown in Fig. 4, well 56 engages member 69 and moves the latter member to an upper position. This upward motion of member 69 carries with it piston 58 due to the fact that the piston cannot displace air in cylinder 70 quickly enough to remain in its lower position. However, when member 69 reaches its upper position, the piston now begins to drop slowly downward and against the projection 57*a* of member 57 to displace the solder in reservoir 37 in the manner previously stated. The speed of the downward motion of piston 58 is controlled by the fit of the piston within the opening 70 in member 69 which controls the rate at which the piston displaces air within this opening, and this speed is also controlled by the weight of the piston which is adjustable by adding additional nut 72 to the top of connecting rod 71. The extent of the downward motion of piston 58 is controlled by nut 72 which contacts the cross arm 68 after the piston has completed a downward stroke of a selected amount.

When the reservoir 37 is returned to its lower position, shown in Fig. 5, member 69 drops to its lower position which rapidly returns piston 58 to the upper end of the opening 70 due to the engagement of nut 72 with bracket 68 so that the mechanism is re-cocked for the next stroke. This return of the piston to the upper end of opening 70 is much more rapid than the drop of the piston due to the superior weight of member 69. With this action, each time the reservoir is moved to its upper position, the solder rises in tubes 39 at a relatively slow and controlled speed, and the rise of solder is controlled so that it terminates at the top of each tube in a soldering meniscus.

Appropriate control mechanisms can be used so that the operations of the machine are properly sequenced and synchronized. That is, motor 14 of Fig. 1 is energized to bring a panel over the solder station at which time that motor is de-energized. Then, motor 28 of Fig. 3 is energized to bring the carriage 35 and reservoir 37 from its lower position of Fig. 4 to its upper soldering position of Fig. 5. Subsequent action of solder displacing mechanism 40 produces localized soldering in the described manner, at the termination of which, the carriage 35 is returned to its lower position. Motor 42 is then energized to replenish the solder supply in reservoir 37, and the cycle is repeated.

A suitable heat insulating substance, such as powdered asbestos may be placed over the top of reservoir 37 between tubes 39 to protect the panel 55 from excessive radiated heat from the reservoir.

It is preferable that well 56 and the well supporting float 50 have a suitable substance therein to keep air from the surface of the molten solder. Powdered asbestos has been used satisfactorily for this purpose.

The invention provides, therefore, an improved mechanism for effecting localized and selective soldering to points on a plated circuit panel assembly. Since the molten solder may be precisely controlled to rise within tubes 39 to the tops thereof, there is no tendency for solder oxides to form on the external surfaces of the tubes with resulting oxide clogging problems.

I claim:

1. A machine for applying solder to parts of the surface of a printed circuit panel which comprises a thin insulated panel with a circuit pattern of thin metal conductors on a side thereof, said machine including an enclosed container for molten solder having a plurality of open-ended tubes extending upwardly therefrom and terminating in a common horizontal plane, conveyor means having supporting portions for each of a plurality of insulated panels and movable intermittently to position successive ones of said supporting portions and the panels carried thereon horizontally over said container, said container being supported for reciprocal motion between a lower position and an upper position adjacent the underside of a panel positioned thereover, means to move said container and tubes to said upper position with the upper end of said tubes positioned adjacent the underside of a printed circuit panel positioned thereover, and means for displacing molten solder in said container when said container is in said upper position to cause solder to rise in said tubes to contact selected points on the panel positioned thereover.

2. A machine as defined in claim 1 in which the solder container includes a well communicating with the interior thereof and the solder displacing means includes a piston position to enter said well when the container is moved to said upper position and thereby to displace molten solder in said container through said tubes for contact with a panel to be soldered thereby.

3. A machine for applying solder to parts of the surface of a printed circuit panel which comprises a thin insulated panel having a circuit pattern of thin metal conductors on a side thereof, said machine including an enclosed container for molten solder having a plurality of open-ended tubes extending upwardly therefrom and terminating in a common horizontal plane, supporting means for said container arranged for reciprocal vertical motion, a cam follower on said supporting means, a cam engaging said cam follower for moving said supporting means between a lower and an upper position, a driving motor for said cam, conveyor means having supporting portions for each of a plurality of insulated panels and movable intermittently to position successive ones of said supporting portions and the panels carried thereon horizontally over said container, said driving motor being operable to rotate said cam to move said supporting means and said solder container to a position with the upper ends of said tubes adjacent the underside of a printed circuit panel positioned thereover, a first hollow cylindrical shaped member extending upwardly from said container and communicating with the interior thereof, a second member having a cylindrical chamber therein supported for reciprocal vertical motion over said first member and adapted to be moved from a lower position to an upper position by said first member when said supporting means is moved to its upper position, said chamber extending inwardly from the lower surface of said second member, a piston supported in close sliding fit within said cylindrical chamber for reciprocal motion along a vertical axis, an upwardly extending vertical connecting rod connected to said piston and projecting through the upper surface of said second member, bracket means extending over said second member for slidably supporting said connecting rod, means mounted on the upper end of said connecting rod for engaging said bracket means to limit the downward stroke of said piston, the upward motion of said second member to its upper position being operable to carry said piston upwardly, and said piston subsequently displacing air in said chamber and moving slowly downward, and displacement means in said container moved by said downward movement of said piston and displacing molten solder in said container so that the solder rises in said tubes to contact selected areas of the plated circuit on the insulated panel supported thereover.

4. A soldering mechanism such as defined in claim 3 and in which said solder container includes heating elements for maintaining solder therein in a molten condition.

5. A soldering mechanism such as defined in claim 3 and in which said solder container includes a well for receiving a replenishing supply of solder, and which includes a reel for feeding solder wire to the well, a guide for directing wire solder from said reel to said last-named well, a feeding means for the solder wire mounted for limited rotation, a motor coaxially mounted with said feeding means, and means for energizing said last-named motor when said container supporting means is in its lower position to rotate said feeding means a selected amount and position the end of said guide over said well and to cause said feeding means subsequently to feed the wire solder through said guide into said well.

6. A soldering mechanism as defined in claim 5 in which there is provided a limit switch for said last-named motor, and a float positioned in said solder container for actuating said limit switch to de-energize said motor when the molten solder in said solder container reaches a selected level.

7. A fluid displacing mechanism for a vertically reciprocable fluid container having a vertically movable displacement means and a fluid outlet, including in combination, a hollow member supported for reciprocal vertical motion and having a vertically extending cavity therein, a piston supported in close sliding fit within said cavity for vertical reciprocal motion and arranged for engagement with the displacement means in the fluid container, an upwardly extending connecting rod affixed to said piston and projecting through the upper surface of said hollow member, bracket means extending over said upper surface of said hollow member and spaced therefrom for slidably supporting said connecting rod, stop means mounted on the upper end of said connecting rod for engaging said bracket means to limit the downward stroke of said piston, the fluid container being operable in its upward movement to engage and move said hollow member to an upward position, the upward motion of said hollow member to said upward position carrying said piston upwardly, said piston subsequently moving slowly downward and engaging the displacement means to displace fluid through the outlet of the fluid container, and the return of said hollow member to its lower position causing said stop means to engage said bracket means and return said piston to the top of said cavity.

8. A mechanism for displacing molten solder out of a vertically reciprocable reservoir having a vertically movable displacement means and an outlet for molten solder, including in combination, a hollow member supported for reciprocal vertical motion and having an opening extending upwardly therein from the bottom surface thereof, a piston supported in close sliding fit within said opening for vertical reciprocal motion and arranged for engagement with the displacement means in the solder reservoir, an upwardly extending connecting rod affixed to said piston and projecting through the top surface of said hollow member, bracket means extending over said top surface and spaced therefrom for slidably supporting said connecting rod, stop means mounted on the upper end of said connecting rod for engaging said bracket means to limit the downward stroke of said piston, the solder reservoir being operable in its upward movement to engage and move said hollow member to an upper position, the upward movement of said hollow member to an upper position carrying said piston upwardly, said piston subsequently moving slowly downward and engaging the displacement means to displace molten solder through the outlet of the solder reservoir, and the return of said hollow member to a lower position causing said stop means to engage said bracket means and return said piston to the top of said opening.

9. A mechanism for displacing molten solder out of a vertically reciprocable reservoir having a vertically movable displacement means and an outlet for molten solder, including in combination, a pair of upright spaced parallel vertical guide members, a crossbar connecting the upper ends of said members, a hollow member slidably supported on said guide members for reciprocal vertical motion and having a cylindrical shaped opening therein extending upwardly from the bottom surface thereof, a piston supported in close sliding fit within said opening for vertical reciprocal motion and arranged for engagement with the displacement means in the solder reservoir, an upwardly extending vertical connecting rod affixed to said piston and projecting through the upper surface of said hollow member and through an aperture in said cross bar, limiting means adjustably mounted on the upper end of said connecting rod for engaging said crossbar to limit the downward motion of said piston, the solder reservoir being operable in its upward movement to engage and move said hollow member to an upper position, the upward motion of said hollow member to an upper position carrying said piston upwardly, said piston subsequently moving slowly downward and engaging the displacement means to displace molten solder through the outlet of the solder reservoir, and the return of said hollow member to a lower position causing said limiting means to engage said crossbar and return said piston to the top of said opening.

References Cited in the file of this patent

UNITED STATES PATENTS

| | | |
|---|---|---|
| 1,193,425 | Robinson et al. | Aug. 1, 1916 |
| 2,619,063 | Anderson | Nov. 25, 1952 |